United States Patent [19]

Yoshida et al.

[11] Patent Number: 5,740,262
[45] Date of Patent: Apr. 14, 1998

[54] NOISE REMOVING APPARATUS USING A MICROPHONE

[75] Inventors: Toshio Yoshida; Michitaka Sisido, both of Tokyo, Japan

[73] Assignee: NEC Corporation, Toyko, Japan

[21] Appl. No.: 364,613

[22] Filed: Dec. 27, 1994

[30] Foreign Application Priority Data

Dec. 28, 1993 [JP] Japan .................. 5-338494

[51] Int. Cl.$^6$ .......................... H04R 25/00
[52] U.S. Cl. .................. 381/169; 321/92; 321/168
[58] Field of Search .................. 381/91, 92, 122, 381/155, 158, 159, 168, 169, 205, 157; 379/428, 431, 433, 440; 181/158, 159, 160, 161, 157

[56] References Cited

U.S. PATENT DOCUMENTS

| | | | |
|---|---|---|---|
| 2,672,932 | 2/1954 | Volkmann et al. | 381/169 |
| 2,718,272 | 8/1955 | Olson et al. | 381/159 |
| 3,585,317 | 6/1971 | Dvorsky | 381/159 |
| 3,947,646 | 3/1976 | Saito | 381/169 |
| 4,637,489 | 1/1987 | Iwanaka et al. | 381/158 |
| 4,677,675 | 6/1987 | Killion et al. | 381/68.2 |

FOREIGN PATENT DOCUMENTS

| | | |
|---|---|---|
| 0161735 | 11/1985 | European Pat. Off. . |
| 4107371A1 | 9/1992 | Germany . |
| 247489 | 9/1992 | Japan . |

Primary Examiner—Huyen D. Le
Attorney, Agent, or Firm—Laff, Whitesel, Conte & Saret, Ltd.

[57] ABSTRACT

An arrangement for noise removal according to the present invention includes a microphone and an acoustic high-pass filter positioned in front of the microphone and consisting of the combination of an acoustic resistance, an acoustic compliance and an inertance. According to the invention, the acoustic resistance is composed of nonwoven fabric; the acoustic compliance, of a cavity; and the inertance, of a thin cavity connected to said cavity. This acoustic high-pass filter reduces unpleasant noise which arises from the microphone when a low-frequency high-pressure air stream, such as the speaker's breath, hits the mouthpiece of the telephone.

4 Claims, 3 Drawing Sheets

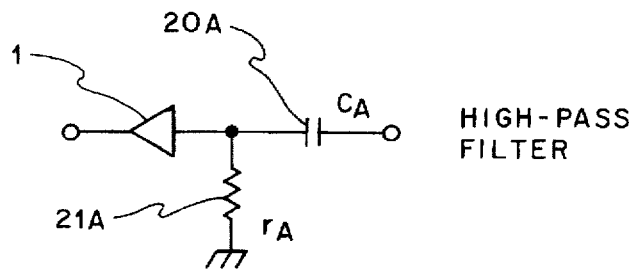
FIG. 2A — HIGH-PASS FILTER
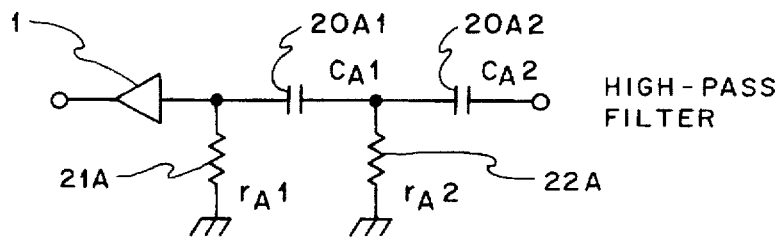
FIG. 2B — HIGH-PASS FILTER
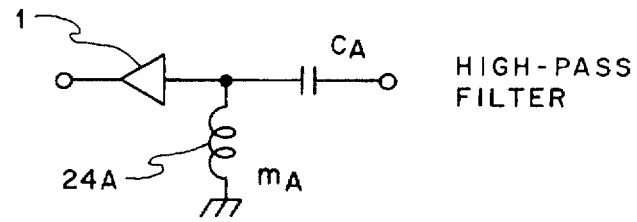
FIG. 2C — HIGH-PASS FILTER
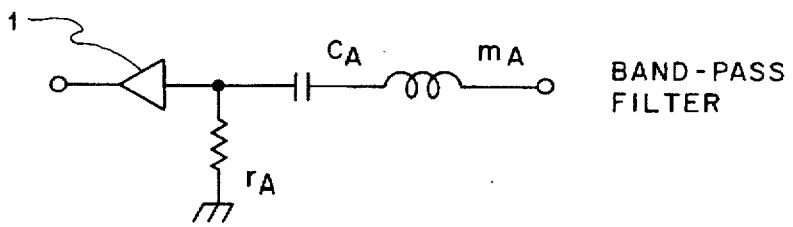
FIG. 2D — BAND-PASS FILTER
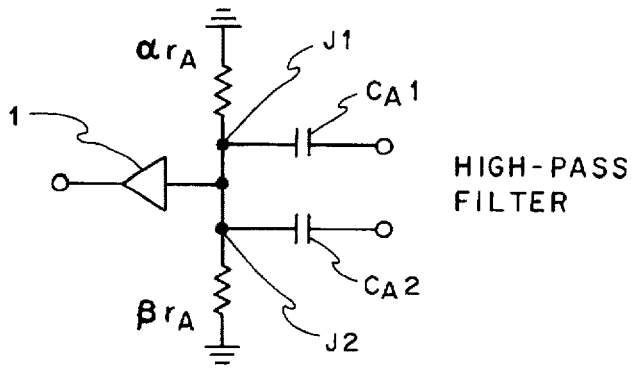
FIG. 2E — HIGH-PASS FILTER 5,740,262

NOISE REMOVING APPARATUS USING A MICROPHONE

BACKGROUND OF THE INVENTION

The present invention relates to a noise removing apparatus, and more particularly to a noise removing apparatus using a microphone.

A typical noise removing apparatus according to the related art is disclosed in the Japanese Patent Laid-open No. 247498 of 1992. The conventional noise removing apparatus is provided with a first microphone into which speech signals are entered and a second microphone into which ambient noise is entered. Noise is removed by subtracting the ambient noise entered into the second microphone from the ambient noise-containing speech signals entered into the first microphone.

However, it is difficult for such a noise removing apparatus to cancel locally generating noise such as a low-frequency high-pressure air stream, e.g. the speaker's breath, because the noise signal enters into only one of the microphones. Furthermore, since the two microphones have to be positioned at some distance from each other, this arrangement is hardly applicable to a portable system, such as a portable telephone, in which the available space is narrowly limited.

SUMMARY OF THE INVENTION

An object of the present invention is to obviate the aforementioned disadvantages and provide an arrangement for noise removal, which is capable of reliably removing noise including low-frequency high-pressure air streams.

An arrangement for noise removal according to the invention is provided with a hole for the speech input, bored in the casing of the telephone set to constitute an acoustic inertance, and a filter body installed within the casing. This filter body has a cavity, continuous to the speech input hole, constituting an acoustic compliance, and a holding hole for holding a microphone. In the holding hole is kept the microphone, and in front of the microphone is arranged a member constituting an acoustic resistance.

BRIEF DESCRIPTION OF THE DRAWINGS

The above-mentioned and other objects, features and advantages of the present invention will become more apparent from the following detailed description when taken in conjunction with the accompanying drawings, wherein:

FIGS. 1A through 1E and FIGS. 2A through 2E are diagrams for explaining the principle of the noise removing apparatus according to the invention;

DETAILED DESCRIPTION OF THE PREFERRED EMBODIMENTS

First will be explained the principles of the present invention with reference to FIGS. 1A and 1E and FIGS. 2A through 2E.

According to the invention, the mouthpiece is so configured as to constitute an acousto-structural filter serving as a noise removing apparatus and to reduce the noise content of signals. This filter basically includes the combination of a microphone and what may become necessary out of three constituent units arranged upstream of the microphone. The three constituent units are an acoustic resistance $r_A$, an acoustic compliance $C_A$ and an inertance $m_A$. Structurally, the acoustic resistance $r_A$ can be composed of nonwoven fabric (net) to attenuate sound. The acoustic compliance $C_A$ can be composed of a pipe having an opening at one end and having no constricted part, and the inertance $m_A$, of a pipe having an opening at each end and having no constricted part. The right-hand side of a microphone 1 is the input section (diaphragm), and speech is entered from the right-hand side of the drawings.

Figure 1A:
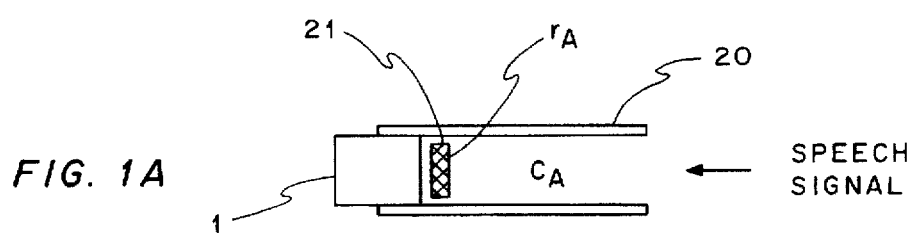

Referring to FIG. 1A, the microphone 1 is arranged at one end of a metallic or plastic pipe 20 having an opening at each end. In this configuration, as one end of the pipe 20 is blocked by the microphone 1, the other end of this pipe 20 is open to constitute an acoustic compliance (hereinafter simply referred to as "compliance") CA. The value of the compliance CA is determined by the length and bore of the pipe among other factors. Referring further to FIG. 1A, a piece of nonwoven fabric 21 is arranged in front of the microphone 1 to constitute an acoustic resistance $r_A$, whose value $r_a$ is determined by the volume and material of the nonwoven fabric piece 21 among other factors. An electrically equivalent circuit having such a structure, as illustrated in FIG. 2A, as expressed as a high-pass filter (HPF) having a resistor 21A and a capacitor 20A.

Figure 1B:
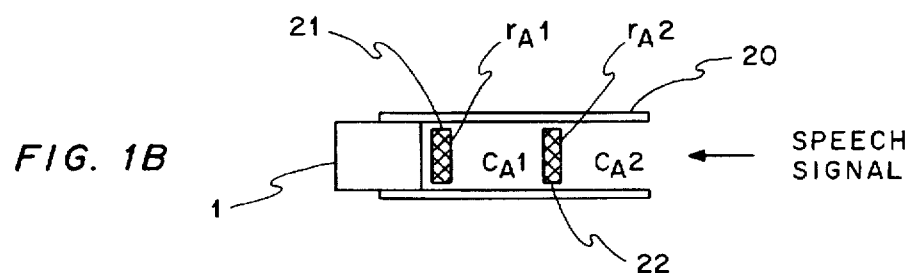

In the structure shown in FIG. 1B, a second nonwoven fabric piece 22, separately from the first nonwoven fabric piece 21, is arranged in the intermediate part of the pipe 20 of FIG. 1A, and two compliance CA1 and CA2 are thereby formed in the pipe 20. The electric circuit here, as shown in FIG. 2B, is expressed as an HPF having two resistors 21A and 22A and two capacitors 20A1 and 20A2.

Figure 1C:
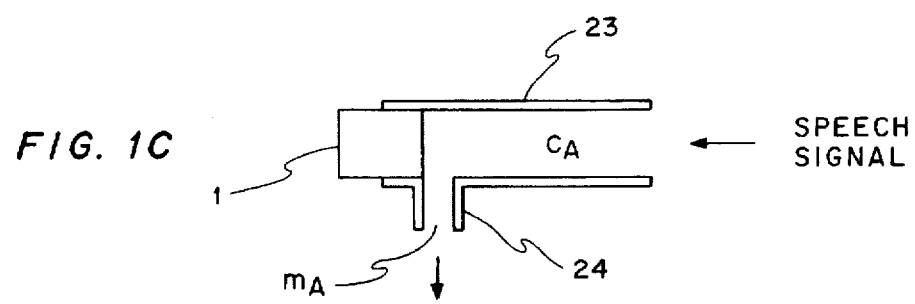

On the other hand, in the structure of FIG. 1C, a pipe section 24 having an opening at each end is formed in the intermediate part of the pipe of FIG. 1A. This pipe section 24 constitutes an inertance $m_a$, which, as illustrated in FIG. 2C, is expressed as an inductance 24A in an equivalent circuit. FIG. 2C also shows an HPF.

Figure 1D:
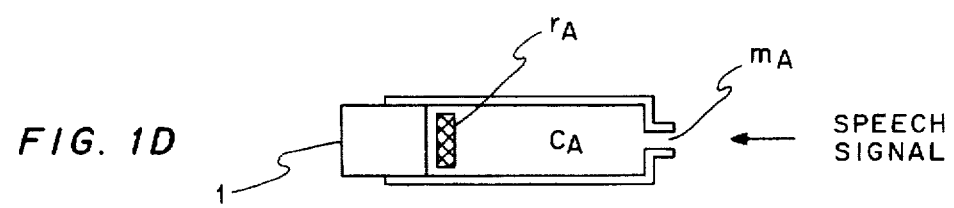
Figure 1E:
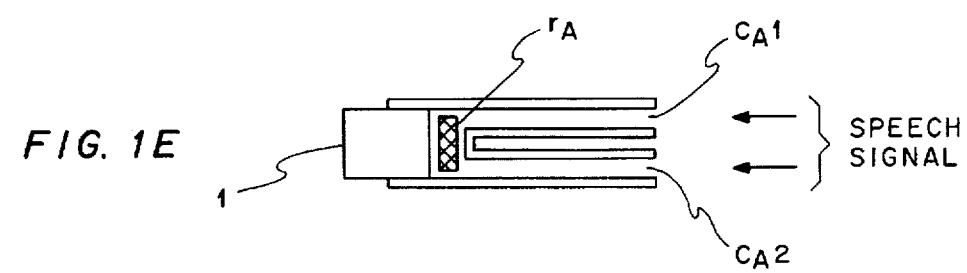

FIGS. 1D and 1E, as described above, also illustrate the realization of a compliance CA, a resistance $r_a$ and an inertance $m_a$ by the combination of a pipe and nonwoven fabric, and accordingly their detailed description is dispensed with.

Electrically equivalent circuits in these cases are shown in FIGS. 2D and 2E, respectively. FIG. 2E shows the microphone 1 as an amplifier having an output and an input connected to junctions J1, J2. Two capacitors $C_A1$ and $C_A2$ are connected in parallel and to two circles representing input holes $M_A1$ and $M_A2$ (FIG. 4B). The other side of capacitors $C_A1$, $C_A2$ is connected to resistors $\alpha r_A$ and $\beta r_A$ at junctions J1 and J2. Incidentally, FIG. 2D illustrates a band-pass filter (BPF), and FIG. 2E, an HPF.

Thus it is to be understood that a resistor, a capacitor and an inductance may constitute an electric filter which can be acoustically realized by the combination of a pipe and nonwoven fabric.

Next, filters according to the invention, embodying the above-explained principle, will be described with reference to FIGS. 3 and 4. Although each of the embodiments to be described below is a portable telephones using a condenser microphone, the applicability of the invention is not limited to a telephone. In each embodiment, the input section of the microphone 1 is at the bottom end of the diagram, and speech signals are entered from outside the telephone casing via an inertance $m_A$.

Figure 3A:
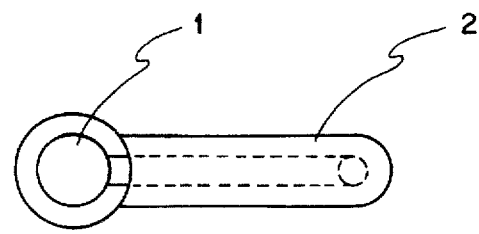
FIGS. 3A and 3B show respectively a plane view of one preferred embodiment of the invention and a cross-sectional view thereof.
Figure 3B:
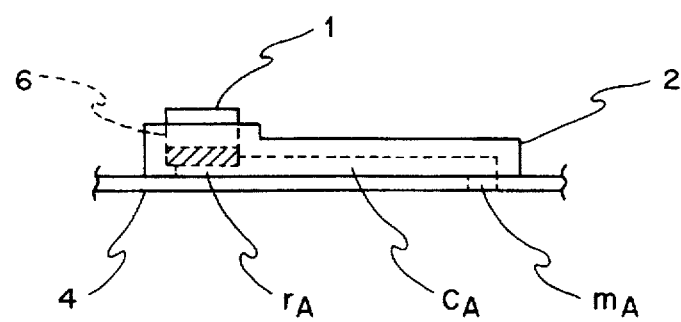

In the first preferred embodiment illustrated in FIGS. 3A and 3B, a rubber-built filter body 2 is fitted with adhesive to the inside of the front plate 4 of the casing. The front plate 4 has a speech input hole to constitute the inertance $m_A$. The filter body 2 has a cavity, connected to the speech input hole, to constitute the acoustic compliance CA and a hole 6 for supporting and holding the microphone 1. The microphone 1 is fixed to the hole 6 with, e.g., adhesive. Below the microphone 1 is arranged a nonwoven fabric net to constitute an acoustic resistance $r_A$. As is evident from FIG. 3, an electrically equivalent circuit to the first embodiment is represented in FIG. 2D, which illustrates an HPF, and removes low-frequency noise.

Figure 4A:
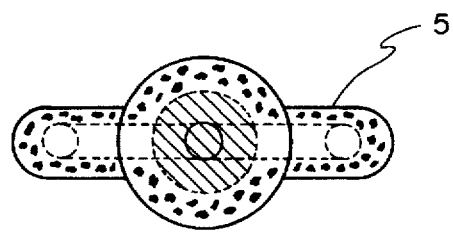
FIGS. 4A and 4B show respectively a plan view of another preferred embodiment of the invention and a cross-sectional view thereof.
Figure 4B:
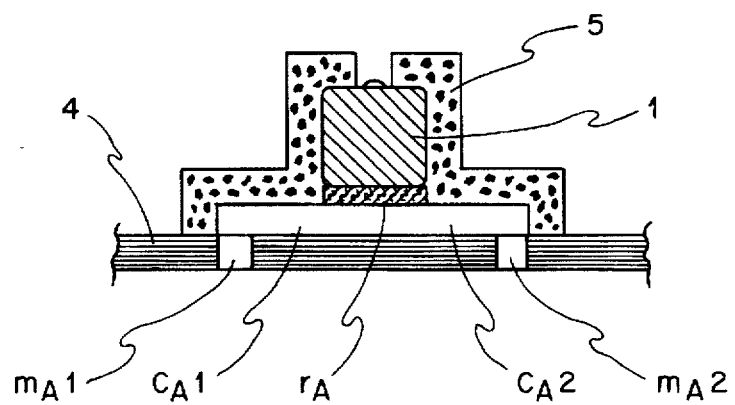

Referring to FIGS. 4A and 4B, a second preferred embodiment of the present invention has a rubber-built filter body 5 having a convexly shaped cross section, fitted to the inside of the front plate 4 of the telephone casing. The front plate 4, unlike that of the first embodiment, has two holes to constitute two inertances $m_A1$ and $m_A2$. The filter body 5 has cavities, connected to these inertances $m_A1$ and $m_A2$, to constitute two acoustic compliances CA1 and CA2. The filter body 5 further has in its upper part a holding hole for housing the microphone 1. Below the microphone 1 is arranged a piece of nonwoven fabric which is positioned in direct contact with the microphone, the non-woven fabric constitutes an acoustic resistance $r_A$. An electrically equivalent circuit to this second embodiment is represented by a circuit in which inductances $m_A1$ and $m_A2$ are connected in series to the capacitors CA1 and CA2, respectively, of FIG. 2E. The second embodiment, like the first embodiment, can suppress low-frequency noise.

As hitherto described, the present invention makes it possible, even if such a low-frequency high-pressure air stream as an external wind or the speaker's breath hits the mouthpiece of a capacitor microphone of an apparatus frequency used outdoors, such as a portable telephone, to selectively reduce unpleasant noise resulting from this air stream without significantly bringing down the speech level.

What is claimed is:

1. An arrangement for noise removal comprising:
    a microphone located in an end of an open ended pipe, an non-woven fabric positioned in direct contact with said microphone and inside said pipe;
    an acoustic filter means positioned in front of said microphone;
    wherein said acoustic filter means includes:
    at least one sound input hole bored in a casing of an electronic apparatus incorporating said microphone to provide an acoustic inertance;
    a filter body installed within said casing, said filter body having at least one cavity communicating with said at least one hole to constitute at least one acoustic compliance and a holding hole for receiving and supporting said microphone, said compliance being determined by the length and bore of said pipe; and
    the non-woven fabric being positioned within the holding hole to constitute an acoustic resistance, said acoustic resistance being determined by the volume and material of said nonwoven fabric, and said acoustic filter being tuned to reject ambient background noise.

2. The arrangement of claim 1 wherein said electronic apparatus is a telephone.

3. The arrangement of claim 1 wherein said ambient background noise includes sound caused by a person breathing into the microphone.

4. A noise rejecting microphone arrangement, said arrangement comprising an elastomeric body having a first cavity for receiving and supporting a telephone microphone, and a second, cavity in front of said microphone, an acoustic resistance comprising a non-woven fabric, said non-woven fabric being positioned in direct contact with said microphone and located within said first cavity, said second cavity forming a compliance chamber in communication with said first cavity via said acoustic resistance, a plate closing said second cavity at a location removed from said acoustic resistance, and a pair of inertances formed in said plate, said acoustic resistance, compliance chamber, inertances being tuned to reject ambient background noise caused by a person breathing into said telephone microphone, said acoustic resistance and said compliance chamber being tuned to be equivalent to an electrical circuit comprising two parallel capacitors in simulation of said compliance chamber, both of said capacitors being coupled to an input of said microphone, and two resistors in simulation of said acoustic resistance coupled at individually associated junctions between said capacitors and said input is of said microphone.

* * * * *